United States Patent
Navarro et al.

(10) Patent No.: US 10,944,299 B2
(45) Date of Patent: *Mar. 9, 2021

(54) METHODS AND SYSTEMS FOR MULTI-OBJECTIVE OPTIMIZATION AND/OR WIRELESS POWER DELIVERY

(71) Applicant: Supply, Inc., Emeryville, CA (US)

(72) Inventors: Gustavo Navarro, Emeryville, CA (US); Varun Ramaswamy, Emeryville, CA (US); Christopher Joseph Davlantes, Emeryville, CA (US)

(73) Assignee: Supply, Inc., Emeryville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,473

(22) Filed: Jun. 11, 2020

(65) Prior Publication Data

US 2020/0303965 A1 Sep. 24, 2020

Related U.S. Application Data

(63) Continuation of application No. 16/698,196, filed on Nov. 27, 2019, now Pat. No. 10,778,044.

(Continued)

(51) Int. Cl.
*H02J 50/40* (2016.01)
*H02J 50/90* (2016.01)
(Continued)

(52) U.S. Cl.
CPC .............. *H02J 50/40* (2016.02); *G06F 17/11* (2013.01); *G06F 17/12* (2013.01); *G06N 3/006* (2013.01);
(Continued)

(58) Field of Classification Search
CPC .. H02J 50/40; H02J 50/80; H02J 50/20; H02J 50/90; G06F 17/12; G06F 17/11; G06N 3/006

See application file for complete search history.

(56) References Cited

U.S. PATENT DOCUMENTS 6,967,462 B1 11/2005 Landis
7,424,058 B1 9/2008 Staley et al.
(Continued)

FOREIGN PATENT DOCUMENTS

CN 104702105 A 6/2015

OTHER PUBLICATIONS

Wang et al. "PROCEED: A Pareto optimization-based circuit-level evaluator for emerging devices." In: IEEE Transactions on Very Large Scale Integration (VLSI) Systems. Feb. 12, 2015.
(Continued)

*Primary Examiner* — Rexford N Barnie
*Assistant Examiner* — Kalu Kelly Emeaba
(74) *Attorney, Agent, or Firm* — Jeffrey Schox; Samuel Rosenthal (57) ABSTRACT

A method for multi-objective optimization, preferably including: evaluating objective functions at a point, determining a plurality of initial points, and/or determining a final point. A method for wireless power delivery, preferably including performing the method for multi-objective optimization to optimize wireless power delivery. A system for multi-objective optimization, preferably including one or more computation modules and one or more objective function evaluation modules, such as one or more wireless power transmitters and/or receivers.

20 Claims, 7 Drawing Sheets

Related U.S. Application Data (60) Provisional application No. 62/888,817, filed on Aug. 19, 2019, provisional application No. 62/773,935, filed on Nov. 30, 2018.

(51) Int. Cl.

| | |
|---|---|
| *G06N 3/00* | (2006.01) |
| *G06F 17/12* | (2006.01) |
| *H02J 50/80* | (2016.01) |
| *H02J 50/20* | (2016.01) |
| *G06F 17/11* | (2006.01) |

(52) U.S. Cl.
CPC .............. *H02J 50/20* (2016.02); *H02J 50/80* (2016.02); *H02J 50/90* (2016.02)

(56) References Cited

U.S. PATENT DOCUMENTS

| | | |
|---|---|---|
| 7,502,340 B1 | 3/2009 | Chuang et al. |
| 8,134,516 B1 | 3/2012 | Yaghjian et al. |
| 8,159,364 B2 | 4/2012 | Zeine |
| 8,175,660 B2 | 5/2012 | Porwal |
| 8,180,286 B2 | 5/2012 | Yamasuge |
| 8,338,991 B2 | 12/2012 | Von et al. |
| 8,650,418 B2 | 2/2014 | Wu |
| 8,682,318 B2 | 3/2014 | Lee et al. |
| 8,766,544 B2 | 7/2014 | Velazquez |
| 8,772,967 B1 | 7/2014 | Ikriannikov et al. |
| 9,142,990 B2 | 9/2015 | Keeling et al. |
| 9,288,769 B2 | 3/2016 | Tandai et al. |
| 9,368,020 B1 | 6/2016 | Bell et al. |
| 9,425,629 B2 | 8/2016 | Kim et al. |
| 9,544,004 B2 | 1/2017 | Callaway et al. |
| 9,547,099 B2 | 1/2017 | Shih |
| 9,608,454 B2 | 3/2017 | Sankar |
| 9,622,195 B2 | 4/2017 | Ko et al. |
| 9,711,978 B2 | 7/2017 | Manova-Elssibony et al. |
| 9,853,486 B2 | 12/2017 | Liu et al. |
| 9,859,757 B1 | 1/2018 | Leabman et al. |
| 9,876,380 B1 | 1/2018 | Leabman et al. |
| 9,882,427 B2 | 1/2018 | Leabman et al. |
| 9,893,555 B1 | 2/2018 | Leabman et al. |
| 9,967,462 B2 | 5/2018 | Kimura et al. |
| 10,069,592 B1 | 9/2018 | Krunz et al. |
| 10,135,257 B1 | 11/2018 | Adolf et al. |
| 10,181,729 B1* | 1/2019 | DeVaul .................. H02J 50/80 |
| 10,199,849 B1 | 2/2019 | Bell et al. |
| 2002/0111905 A1 | 8/2002 | Nagafuchi et al. |
| 2004/0203846 A1 | 10/2004 | Caronni et al. |
| 2005/0090287 A1 | 4/2005 | Rofougaran |
| 2005/0170788 A1 | 8/2005 | Tanaka et al. |
| 2006/0088123 A1 | 4/2006 | Jensen et al. |
| 2007/0155347 A1 | 7/2007 | Heuermann et al. |
| 2007/0156343 A1 | 7/2007 | Rayan et al. |
| 2007/0243851 A1 | 10/2007 | Shoarinejad et al. |
| 2008/0057880 A1 | 3/2008 | Copeland |
| 2008/0225639 A1 | 9/2008 | Hongou |
| 2009/0210366 A1 | 8/2009 | Sakata et al. |
| 2009/0284082 A1 | 11/2009 | Mohammadian |
| 2010/0033021 A1 | 2/2010 | Bennett |
| 2010/0226448 A1 | 9/2010 | Dent |
| 2011/0141148 A1 | 6/2011 | Hill et al. |
| 2011/0156640 A1 | 6/2011 | Moshfeghi |
| 2011/0216564 A1 | 9/2011 | Swamy |
| 2011/0224817 A1 | 9/2011 | Dubrov et al. |
| 2011/0281535 A1 | 11/2011 | Low et al. |
| 2011/0282535 A1 | 11/2011 | Woody et al. |
| 2012/0109606 A1 | 5/2012 | Dotan et al. |
| 2012/0217818 A1 | 8/2012 | Yerazunis et al. |
| 2012/0281556 A1* | 11/2012 | Sayana ................. H04L 5/0035 370/252 |
| 2012/0300592 A1 | 11/2012 | Perry |
| 2012/0313450 A1 | 12/2012 | Nam et al. |
| 2013/0043734 A1 | 2/2013 | Stone et al. |
| 2013/0066471 A1 | 3/2013 | Wang et al. |
| 2013/0113299 A1 | 5/2013 | Von et al. |
| 2014/0028110 A1 | 1/2014 | Petersen et al. |
| 2014/0028111 A1 | 1/2014 | Hansen et al. |
| 2014/0062395 A1 | 3/2014 | Kwon et al. |
| 2014/0070621 A9 | 3/2014 | Von Novak et al. |
| 2014/0106761 A1 | 4/2014 | Lee et al. |
| 2014/0133322 A1 | 5/2014 | Steer et al. |
| 2014/0139034 A1 | 5/2014 | Sankar et al. |
| 2014/0203769 A1 | 7/2014 | Keeling et al. |
| 2014/0214743 A1 | 7/2014 | Chester et al. |
| 2014/0239305 A1 | 8/2014 | Shah et al. |
| 2014/0242918 A1 | 8/2014 | Weissman et al. |
| 2014/0361741 A1 | 12/2014 | Von et al. |
| 2014/0375253 A1 | 12/2014 | Leabman et al. |
| 2015/0123496 A1 | 5/2015 | Leabman et al. |
| 2015/0181539 A1 | 6/2015 | Aiba et al. |
| 2015/0280444 A1 | 10/2015 | Smith et al. |
| 2015/0349542 A1 | 12/2015 | Yamamoto et al. |
| 2015/0351054 A1 | 12/2015 | Immonen et al. |
| 2015/0357827 A1 | 12/2015 | Muratov et al. |
| 2015/0371771 A1 | 12/2015 | Abu Qahouq |
| 2016/0026625 A1 | 1/2016 | Walker |
| 2016/0054395 A1 | 2/2016 | Bell et al. |
| 2016/0054396 A1 | 2/2016 | Bell et al. |
| 2016/0056966 A1 | 2/2016 | Bell |
| 2016/0087686 A1 | 3/2016 | Won et al. |
| 2016/0094092 A1 | 3/2016 | Davlantes et al. |
| 2016/0099611 A1 | 4/2016 | Leabman et al. |
| 2016/0099758 A1 | 4/2016 | Bell et al. |
| 2016/0140115 A1 | 5/2016 | Walker |
| 2016/0156268 A1 | 6/2016 | Thomas et al. |
| 2016/0165545 A1 | 6/2016 | Ouchi et al. |
| 2016/0197494 A1 | 7/2016 | Kwon et al. |
| 2016/0216301 A1 | 7/2016 | Holzworth et al. |
| 2016/0233724 A1 | 8/2016 | Bae et al. |
| 2016/0337085 A1 | 11/2016 | Yu et al. |
| 2016/0344431 A1 | 11/2016 | Srirattana et al. |
| 2016/0379753 A1 | 12/2016 | Jang et al. |
| 2017/0025885 A1 | 1/2017 | Blakely et al. |
| 2017/0077736 A1 | 3/2017 | Leabman |
| 2017/0201289 A1 | 7/2017 | Zhang et al. |
| 2017/0261631 A1 | 9/2017 | Donderici et al. |
| 2017/0366242 A1 | 12/2017 | Lee et al. |
| 2018/0118045 A1 | 5/2018 | Gruzen et al. |
| 2018/0131413 A1 | 5/2018 | Won et al. |
| 2018/0262060 A1* | 9/2018 | Johnston ................ H02J 7/0042 |
| 2018/0349434 A1* | 12/2018 | Seidel .................. G06F 16/2365 |
| 2018/0352519 A1 | 12/2018 | Navarro et al. |
| 2018/0375340 A1* | 12/2018 | Bell ........................ H02J 50/30 |
| 2019/0011523 A1* | 1/2019 | Avestruz ................. H02J 50/80 |
| 2019/0020225 A1* | 1/2019 | Kwon ....................... H02J 50/12 |
| 2019/0132098 A1* | 5/2019 | Wernersson ......... H04B 7/0639 |
| 2019/0296547 A1 | 9/2019 | Kelly et al. |
| 2019/0364492 A1 | 11/2019 | Azizi et al. |
| 2020/0266673 A1* | 8/2020 | Reynolds ................ H02J 50/20 |

OTHER PUBLICATIONS

Brown, William C., "The history of power transmission by radio waves" IEEE Transactions on microwave theory and techniques 32, No. 9 (1984): 1230-1242.

Harrington, Roger F., "Effect of Antenna Size on Gain, Bandwidth, and Efficiency", Journal of Research of the National Bureau of Standards—D. Radio Propagation vol. 64D, No. 1, Jan.-Feb. 1960., 12 pages.

Ivrlac, Michel T., "High-Efficiency Super-Gain Antenna Arrays", 2010 International ITG Workshop on Smart Antennas (WSA 2010), 369-374.

Kumar, et al., "Memetic search in differential evolution algorithm." In:arXiv preprint. Aug. 1, 2014 Retreived from <https://arxiv.org/ftp/arxiv/papers/1408/1408.0101.pdf> entire document.

\* cited by examiner

METHODS AND SYSTEMS FOR MULTI-OBJECTIVE OPTIMIZATION AND/OR WIRELESS POWER DELIVERY

CROSS-REFERENCE TO RELATED APPLICATIONS

This application is a continuation of U.S. patent application Ser. No. 16/698,196, filed 27-Nov.-2019, which claims the benefit of U.S. Provisional Application Ser. No. 62/773,935, filed on 30-Nov.-2018, and of U.S. Provisional Application Ser. No. 62/888,817, filed on 19-Aug.-2019, each of which is incorporated in its entirety by this reference.

TECHNICAL FIELD

This invention relates generally to the wireless power delivery field, and more specifically to new and useful methods and systems for multi-objective optimization in the wireless power delivery field.

BACKGROUND

Typical methods and systems for multi-objective optimization may require evaluation of objective functions at numerous points and/or determination of objective function gradients. Such evaluations and/or determinations can be undesirable (e.g., impractical, inefficient, time-consuming, etc.) when applied to wireless power delivery. Thus, there is a need in the wireless power delivery field to create new and useful methods and systems for multi-objective optimization and/or wireless power delivery.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
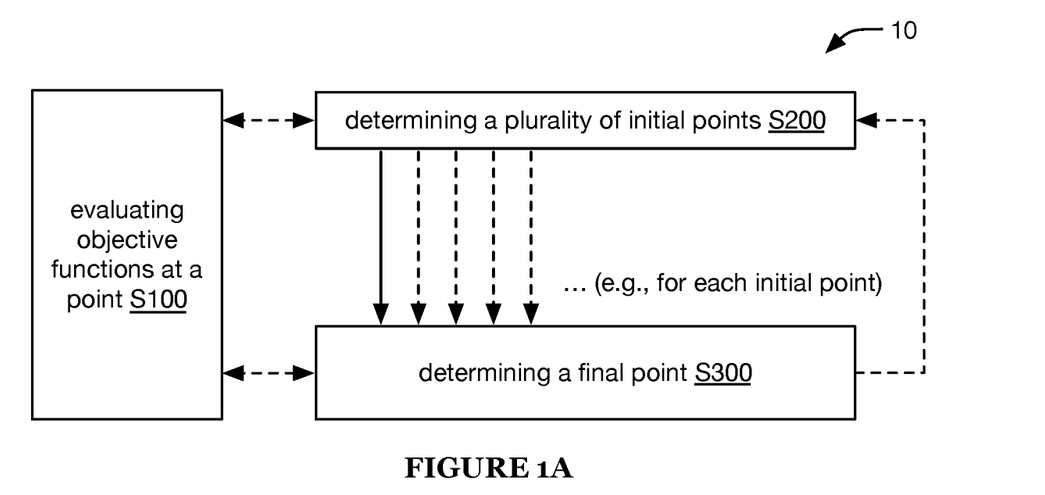
FIGS. 1A-1B are schematic representations of an embodiment of a method for multi-objective optimization and an example of an element of the method, respectively.
Figure 6A:
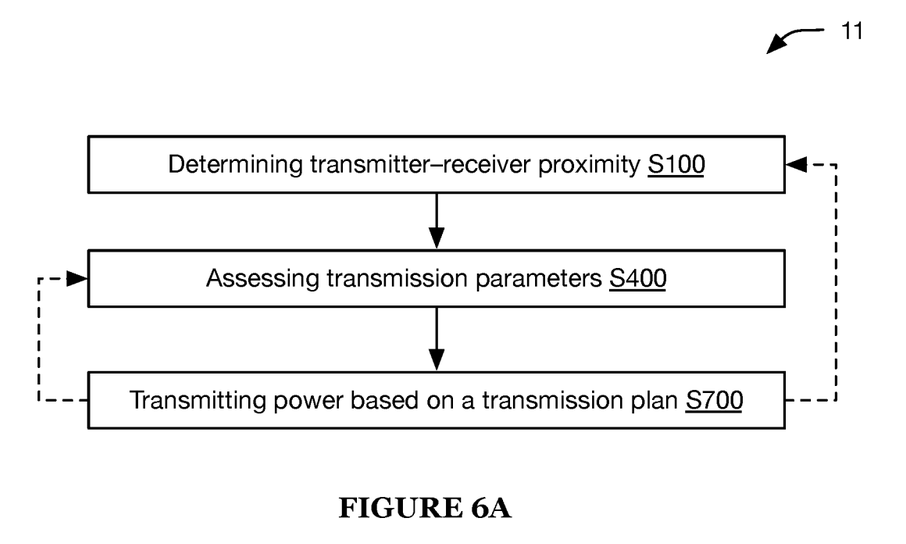
FIGS. 6A-6B are schematic representations of an embodiment of a method for wireless power delivery and an example of an element of the method, respectively.
Figure 6B:
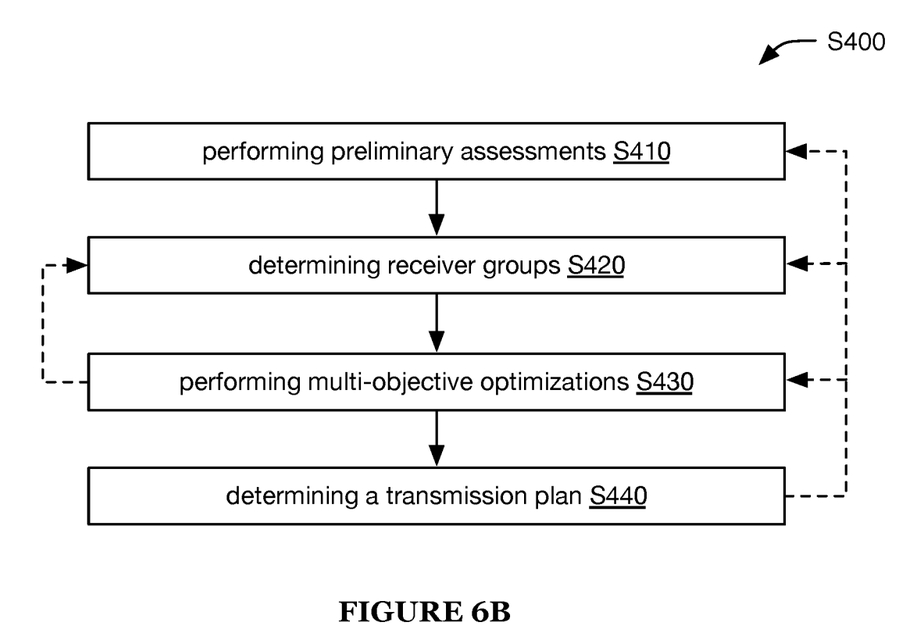

A method 10 for multi-objective optimization preferably includes: evaluating objective functions at a point S100; determining a plurality of initial points S200; and/or determining a final point S300 (e.g., as shown in FIG. 1A). A method 11 for wireless power delivery preferably includes performing one or more of the methods described in U.S. patent application Ser. No. 16/001,725, filed 06-Jun.-2018 and titled "Method and System for Wireless Power Delivery" and/or in U.S. patent application Ser. No. 16/295,684, filed 07-Mar.-2019 and titled "Method and System for Wireless Power Delivery", each of which is herein incorporated in its entirety by this reference, and preferably includes performing one or more elements of the method 10 (e.g., performing the element(s) of the method 10 as a specific implementation of one or more elements of the methods described in U.S. patent application Ser. No. 16/001,725 and/or U.S. patent application Ser. No. 16/295,684).

For example, determining transmission parameter values S200 of U.S. patent application Ser. No. 16/001,725 can include performing one or more elements of the method 10 (e.g., wherein the multi-objective search approach of U.S. patent application Ser. No. 16/001,725 includes performing one or more multi-objective optimizations such as described below). Additionally or alternatively, performing multi-objective optimizations S430 of U.S. patent application Ser. No. 16/295,684 can include using the method 10 (and/or any suitable elements thereof, such as S200 and/or S300) as a multi-objective search approach (e.g., wherein implementing the "high-diversity approach" of U.S. patent application Ser. No. 16/295,684 includes performing S200 of the method 10 described herein, and/or wherein implementing the "high-quality approach" of U.S. patent application Ser. No. 16/295,684 includes performing S300 of the method 10 described herein). In some examples (e.g., as shown in FIGS. 6A-6B), the method 11 includes one or more of (e.g., all of) determining transmitter-receiver proximity S100, assessing transmission parameters S400, and transmitting power based on a transmission plan S700, wherein S400 preferably includes one or more of (e.g., all of) performing preliminary assessments S410, determining receiver groups S420, performing multi-objective optimizations S430 (e.g., as described herein, such as regarding the method 10), and determining a transmission plan S440; preferably performing some or all such elements as described in U.S. patent application Ser. No. 16/295,684. For example, the S400 can include: performing preliminary assessments S410 and/or determining receiver groups S420, preferably as described in U.S. patent application Ser. No. 16/295,684; for each receiver group determined in S420, performing multi-objective optimizations S430 (e.g., as described herein, such as determining a plurality of Pareto points for each receiver group); and (e.g., based on the Pareto points determined in S430) determining a transmission plan S440 (e.g., as described in U.S. patent application Ser. No. 16/295,684); wherein the method 11 preferably includes transmitting power based on the transmission plan determined in S440 (e.g., as described in U.S. patent application Ser. No. 16/295,684, such as regarding S700). However, the method 10 and/or method 11 can additionally or alternatively include any other suitable elements and/or be performed in any other suitable manner.

Figure 2A:
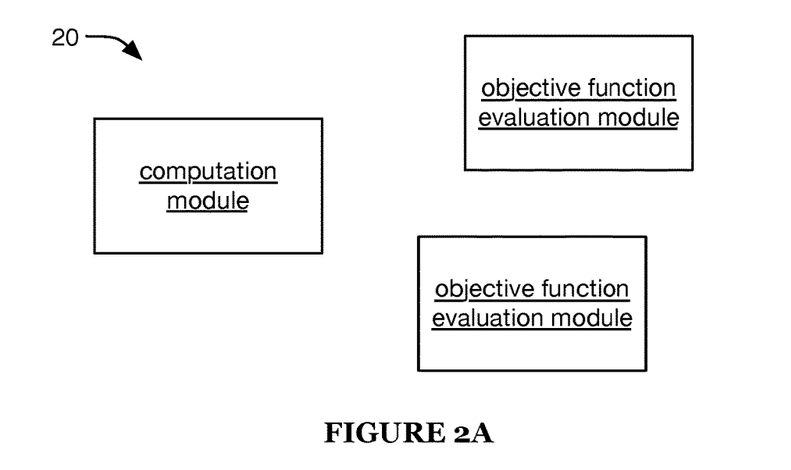
FIGS. 2A-2B are schematic representations of a first and second embodiment, respectively, of the system for multi-objective optimization.
Figure 2B:
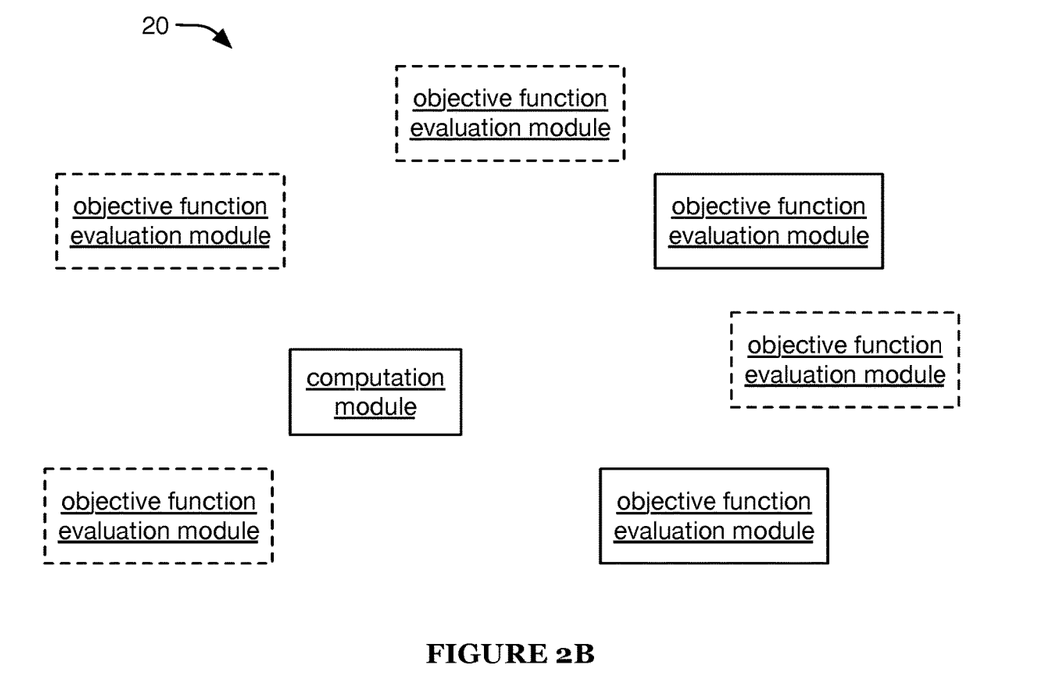
Figure 3A:
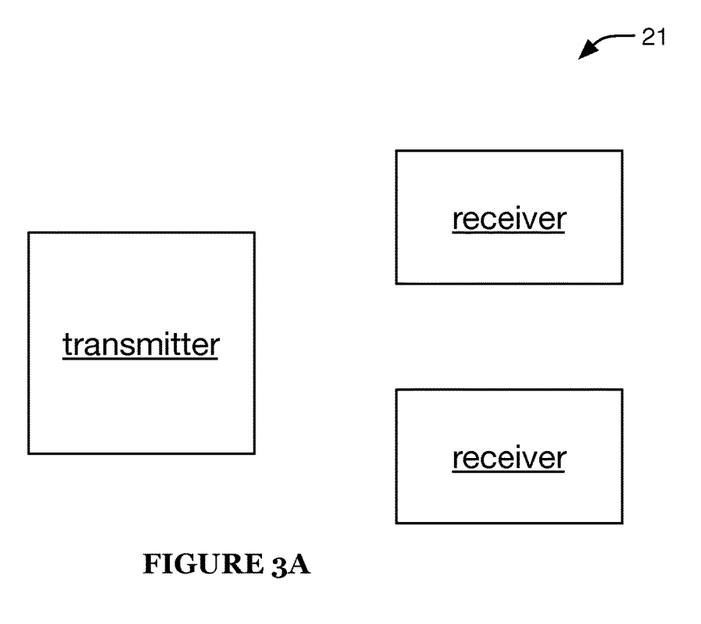
FIG. 3A is a schematic representation of a first embodiment of the system for wireless power delivery.
Figure 3B:
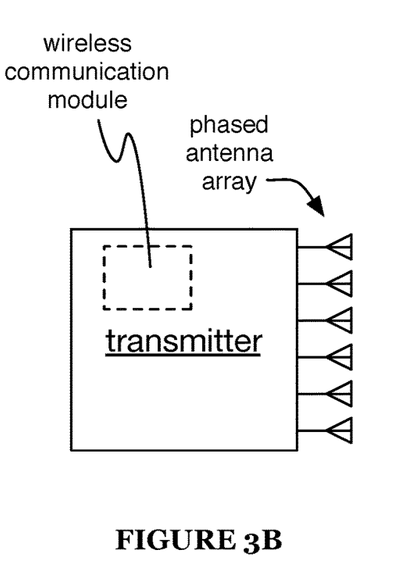
FIGS. 3B-3C are schematic representations of an example of a transmitter and receiver, respectively, of the system for wireless power delivery.
Figure 3C:
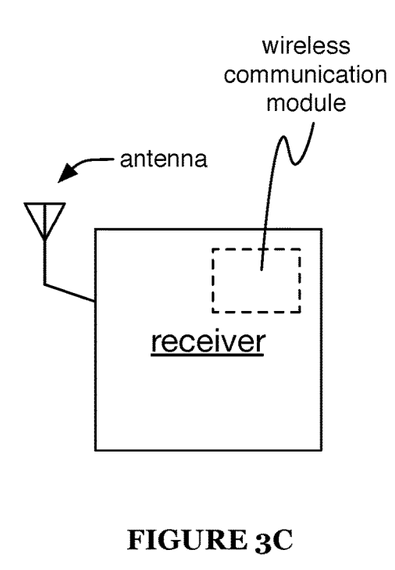
Figure 3D:
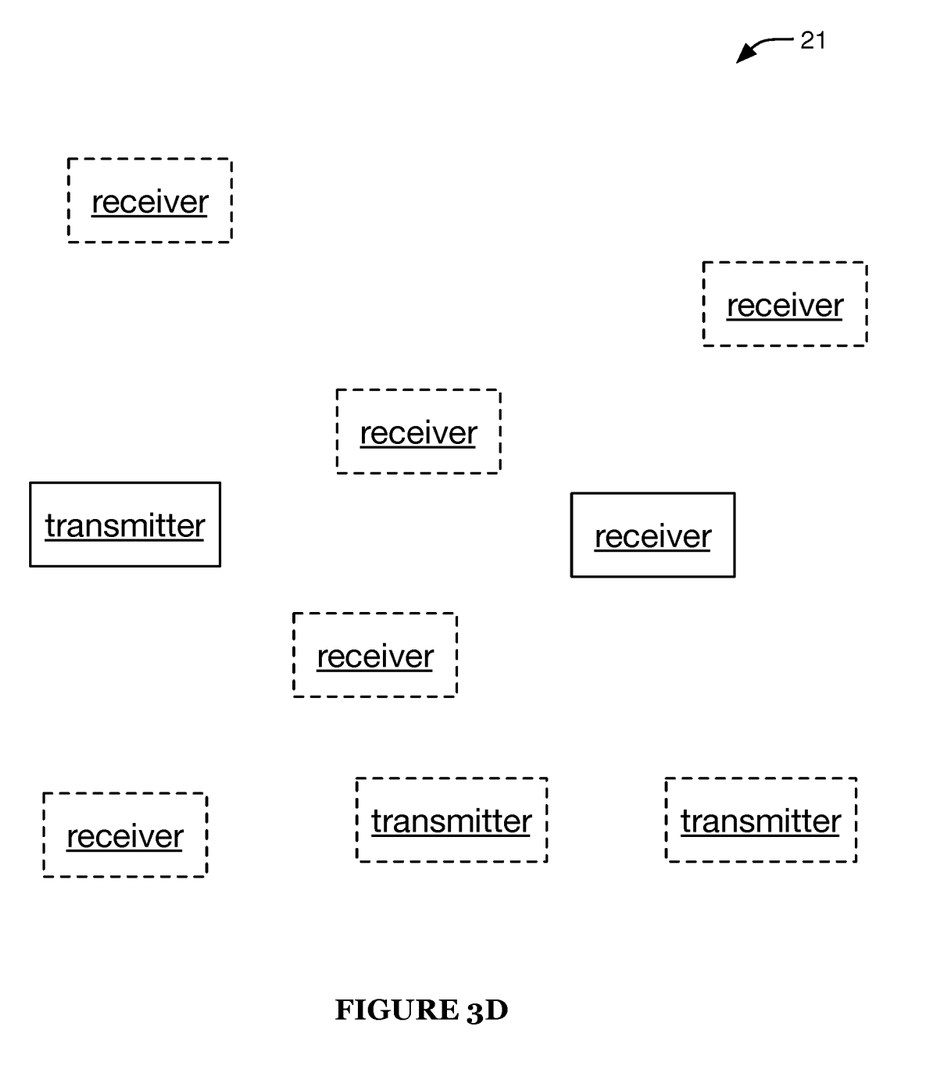
FIG. 3D is a schematic representation of a second embodiment of the system for wireless power delivery.

A system 20 for multi-objective optimization preferably includes one or more computation modules and one or more objective function evaluation modules (e.g., as shown in FIGS. 2A-2B). In some embodiments, one or more of the computation modules can function as one or more objective function evaluation modules. In some embodiments, in which the system 20 includes and/or is associated with a system 21 for wireless power delivery, the system 20 and/or system 21 can include one or more of the systems described in U.S. patent application Ser. No. 16/001,725, filed 06-Jun. 2018 and titled "Method and System for Wireless Power Delivery" and/or in U.S. patent application Ser. No. 62/772,425, filed 28-Nov. 2018 and titled "Method and System for Wireless Power Delivery", each of which is herein incorporated in its entirety by this reference; for example, an objective function evaluation module of the system 20 can include one or more transmitters and/or receivers (and/or elements thereof), such as shown by way of example in FIGS. 3A-3D. However, the system 20 and/or system 21 can additionally or alternatively include any other suitable elements in any suitable arrangement.

2. Method

The method 10 preferably functions to search for points (in a parameter space over which the search is performed) on and/or near the Pareto front defined by a set of objective functions (e.g., as described in the appendix). The Pareto front for a set of objective functions is defined as the set of points that are Pareto efficient (i.e., not Pareto-dominated by any other transmission configuration). For example, for a set with two objective functions ($f_i$ and $f_j$), a Pareto efficient configuration x is one for which there does not exist a configuration x' for which $f_i(x') > f_i(x)$ and $f_j(x') \geq f_j(x)$, nor for which $f_i(x') \geq f_i(x)$ and $f_j(x') > f_j(x)$. Accordingly, the method 11 can function to search for transmission configurations on and/or near the Pareto front defined by a set of receivers.

2.1 Evaluating Objective Functions

Evaluating objective functions at a point S100 preferably functions to determine values associated with one or more objective functions (at the point). The objective function values can be determined based on measurements, such as measurements of physical phenomena associated with operating a system (e.g., the system 20 and/or the system 21) in a manner consistent with the point (e.g., configuring one or more operation parameters based on the point, such as, for each parameter, based on the position of the point along a dimension in the parameter space corresponding to the parameter), based on calculations (e.g., modeling aspects of system performance associated with objective function values; calculating objective function values based on equations and/or other known relationships and/or information; determining derivative values, such as values derived based on one or more measured, stored, received, and/or modeled values, etc.), and/or based on any other suitable evaluation techniques. S100 can additionally or alternatively include computing objective function values, receiving objective function values from other entities, and/or determining objective function values in any other suitable manner.

S100 preferably includes evaluating all objective functions of interest (e.g., the objective functions associated with the receivers of the system and/or the receivers under consideration for the optimization, preferably wherein each receiver is associated with a different objective function). The objective functions are preferably evaluated substantially concurrently, such as evaluated based on the same power transmission event, but can alternatively be evaluated at different times (e.g., evaluating subsets of the objective functions at different times from each other, evaluating each objective function at a separate time, etc.) and/or can be evaluated based on different power transmission events. All of the objective functions are preferably evaluated (e.g., even if some objective function values are not needed for a particular purpose, such as for a particular performance of S100). In some embodiments, the determined objective function values can be cached (e.g., as described in U.S. patent application Ser. No. 16/001,725, filed 06-Jun.-2018 and titled "Method and System for Wireless Power Delivery" and/or in U.S. patent application Ser. No. 16/295,684, filed 07-Mar.-2019 and titled "Method and System for Wireless Power Delivery", each of which is herein incorporated in its entirety by this reference), preferably, caching all objective function values determined. In such embodiments, S100 can optionally include retrieving cached objective function values (e.g., rather than re-determining the cached objective function values). Alternatively, only a subset of the objective functions can be evaluated (e.g., evaluating only a single objective function) and/or S100 can include evaluating any other suitable objective functions in any suitable manner.

In some embodiments, the point can be a transmission configuration, and the objective function values can be associated with receivers of the system (the power received at each receiver, such as at each receiver within communication range of the transmitter; values proportional to such power, such as power delivery efficiency, which may be calculated as power received at a receiver divided by a transmission power value such as transmitted power or power consumed by the transmitter; etc.). In these embodiments, S100 preferably includes evaluating the transmission configuration as described in U.S. patent application Ser. No. 16/001,725, filed 06-Jun.-2018 and titled "Method and System for Wireless Power Delivery", and/or in U.S. patent application Ser. No. 16/539,288, filed 13-Aug.-2019 and titled "Method and System for Wireless Power Delivery", each of which is herein incorporated in its entirety by this reference (e.g., as described regarding determining transmission parameter values S200, such as regarding evaluating candidate transmission parameter values S220 in particular).

For example, evaluating the transmission configuration can include: at the transmitter (e.g., including a plurality of transmission elements, such as an adaptive antenna array), transmitting power (e.g., throughout a time interval) based on the transmission configuration; at one or more receivers, receiving power transmitted by the transmitter (e.g., during the time interval); and, for one or more of the receivers (e.g., for each receiver independently, for one or more groups of receivers, collectively for all the receivers, etc.), determining information associated with the power reception (e.g., amount of power received at the receiver, preferably normalized by the amount of power transmitted by the transmitter), wherein the evaluation is determined based on the information. In a specific example, the transmitter determines how much power it transmits, each receiver determines how much power it receives, and the information is then used to determine a respective power delivery efficiency for each receiver (e.g., wherein the information is communicated to a single entity for analysis, such as wherein each receiver communicates its power reception information to the transmitter). However, S100 can additionally or alternatively include evaluating the transmission configuration in any other suitable manner.

For each transmission configuration evaluated, S100 preferably includes determining and/or caching the corresponding objective space values (e.g., the power received at each receiver, such as at each receiver within communication range of the transmitter; values proportional to such power, such as power delivery efficiency, which may be calculated as power received at a receiver divided by a transmission power value such as transmitted power or power consumed by the transmitter; etc.).

However, the point can additionally or alternatively be a point in any other suitable parameter space, and/or S100 can additionally or alternatively include evaluating the objective functions (e.g., determining the objective function values) in any other suitable manner.

2.2 Determining Initial Points

Determining a plurality of initial points S200 preferably functions to determine initial points for seeding a Pareto front search algorithm.

In a first embodiment, the initial points are determined based on a distribution throughout a parameter space (e.g., random distribution, uniform distribution, etc.), such as the transmission parameter space associated with the transmitter. For example, the initial points can be a uniform array of points in the parameter space (e.g., transmission parameter space), can be concentrated around (e.g., selected randomly around, such as selected within a threshold distance of and/or selected with selection probability dependent on distance from, etc.) one or more known points in the parameter space (e.g., wherein each known point is a known transmission parameter value set, such as a set associated with a previously-used transmitter configuration), and/or can be distributed in any other suitable manner.

In a second embodiment, the initial points are displaced from one or more generation points. The generation points can be points on or near the Pareto front (e.g., determined in previous iterations of S300), can be random points in the parameter space, can be uniformly distributed points in the parameter space, and/or can include any other suitable points.

In a first example of this embodiment, the vectors along which the initial points are displaced from a generation point can have uniform magnitudes, random magnitudes, and/or any other suitable magnitudes. The vectors can have random orientations, regularly-spaced orientations (e.g., regularly spaced about the n-sphere surrounding the generation point in the parameter space, wherein n is the dimension of the parameter space), and/or any other suitable orientations.

In a second example of this embodiment, the initial points are displaced from the generation point along one or more ascent directions, such as the ascent vectors described below regarding S320 and/or the ascent directions described below regarding S330. Preferably, each initial point is displaced from a generation point by one of a plurality of linear combinations of the ascent vectors (e.g., wherein each initial point generated from the generation point is displaced from the generation point by a different linear combination of ascent vectors). The linear combinations can be partitions (e.g., uniform partitions) over combinations of the ascent vectors (e.g., single objective ascent directions), such as wherein a sum over the coefficients of the linear combinations is equal to a constant value (e.g., 1). Alternatively, the linear combinations can have random coefficients (e.g., wherein the coefficients are randomized separately for each initial point generated from a particular generation point) and/or can be determined in any other suitable manner. In some examples, a line search is implemented to determine the magnitude of displacement along each of the ascent directions (e.g., wherein each initial point is displaced from its respective generation point along its respective ascent direction by an optimal or substantially optimal magnitude, such as wherein each initial point is Pareto dominant over its respective generation point).

In a first variation of this embodiment, in which a set of initial points are each displaced from a generation point on or near the Pareto front, the initial points are each displaced by a respective vector. The vectors preferably have uniform magnitudes, but can alternatively have random magnitudes or any other suitable magnitudes. The vectors preferably have random orientations, but can alternatively have orientations defining regular (or substantially regular) angular spacing, and/or have any other suitable orientations (e.g., defining any other suitable distribution).

Figure 5:
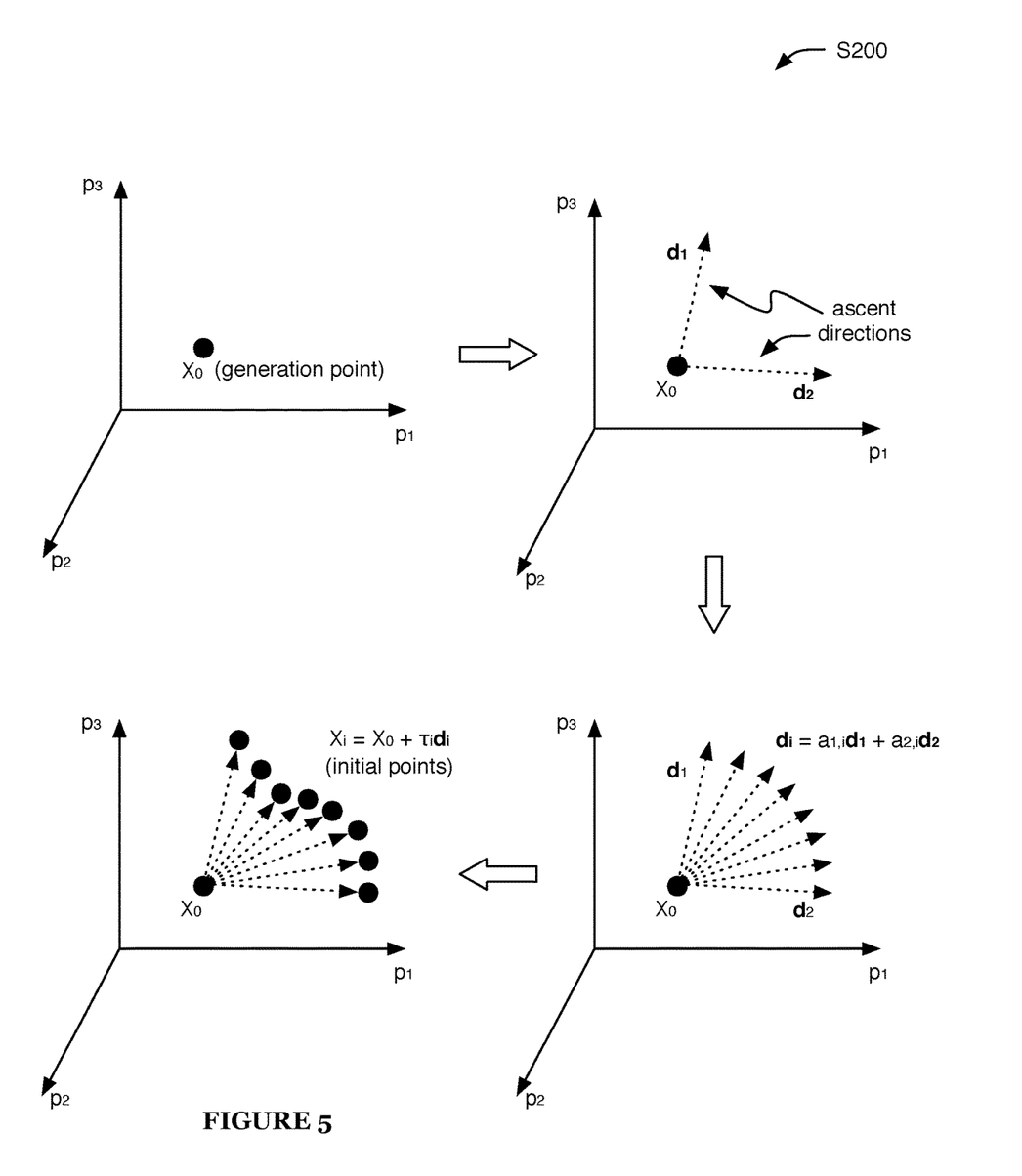
FIG. 5 is a flowchart representation of an example of a second portion of the method.

In a second variation of this embodiment, in which a set of initial points are displaced from a generation point not on or near (or not known to be on or near) the Pareto front, each initial point of the set is displaced by a respective linear combination of local ascent vectors (e.g., single objective ascent directions), wherein each linear combination can be defined by a respective set of coefficients (e.g., each coefficient of a set associated with a different local ascent vector), preferably wherein each such coefficients is greater than or equal to zero (e.g., as shown in FIG. 5). In a first example of this variation, the coefficient values for each linear combination are predetermined. The predetermined values are preferably uniformly-spaced and are preferably subject to a constraint (e.g., wherein a sum over the coefficients is equal to a constant, such as 1). In a specific example, a predetermined number of uniformly-spaced coefficient values (e.g., 10 coefficient values) are used, wherein each set of coefficients sums to 1 (e.g., wherein each of a set of linear combinations d of local ascent vectors $d_1$ and $d_2$ is defined as $d=a_j d_1+(1-a_j)d_2$, wherein the values $a_j$ define the uniform spacing, such as with $a_j=0, 0.1, 0.2, \ldots, 0.9, 1$). In a second example of this variation, the coefficient spacing is dynamically determined. This dynamic determination can function to more evenly distribute the resulting points on the Pareto front (e.g., as compared with a predetermined spacing, such as a uniform spacing). In a specific example, the initial point generation can begin by using a coarse coefficient spacing (e.g., uniform spacing, any other suitable predetermined spacing, preliminary dynamically-determined spacing, etc.). Then, after generating some of the initial points (e.g., after determining initial points for each of the linear combinations arising from the coarsely-spaced coefficients), the spacing around coefficients that generated initial points in sparsely populated regions (e.g., of the Pareto front) can be refined, thereby generating a greater density of initial points in these regions. In some such examples, a line search is performed along each respective linear combination (e.g., determining the position of the respective initial point along that linear combination). In other examples, the initial points are displaced by a uniform distance (e.g., predetermined distance) along the respective linear combinations. However, the initial points can additionally or alternatively be displaced by any other suitable distance(s).

However, S200 can additionally or alternatively include determining any other suitable initial points in any suitable manner.

2.3 Determining the Final Point

Figure 1B:
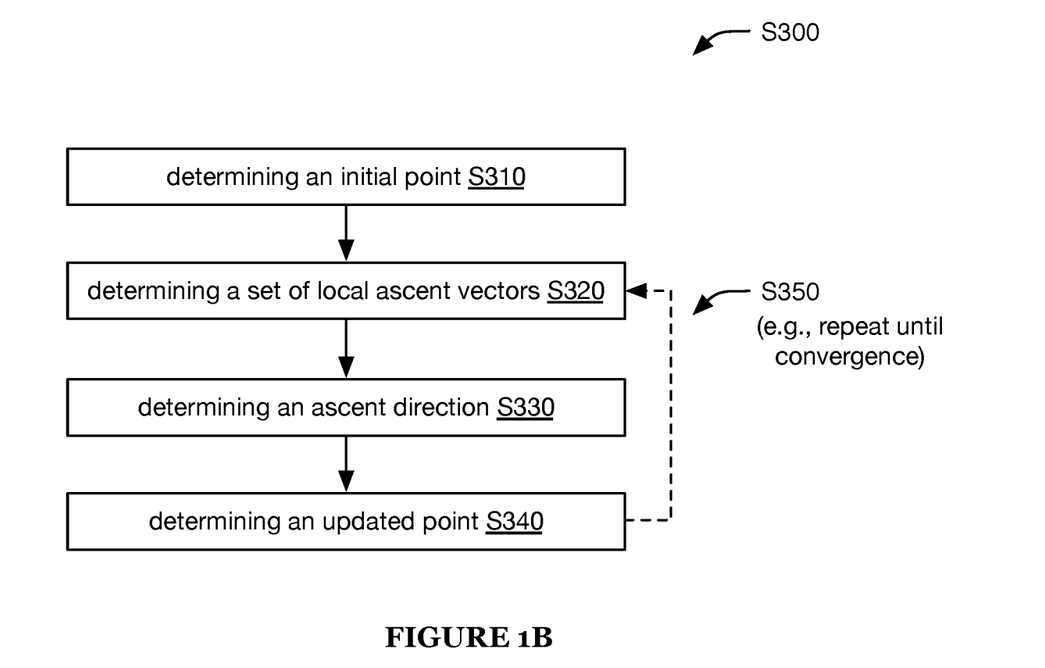
Figure 4:
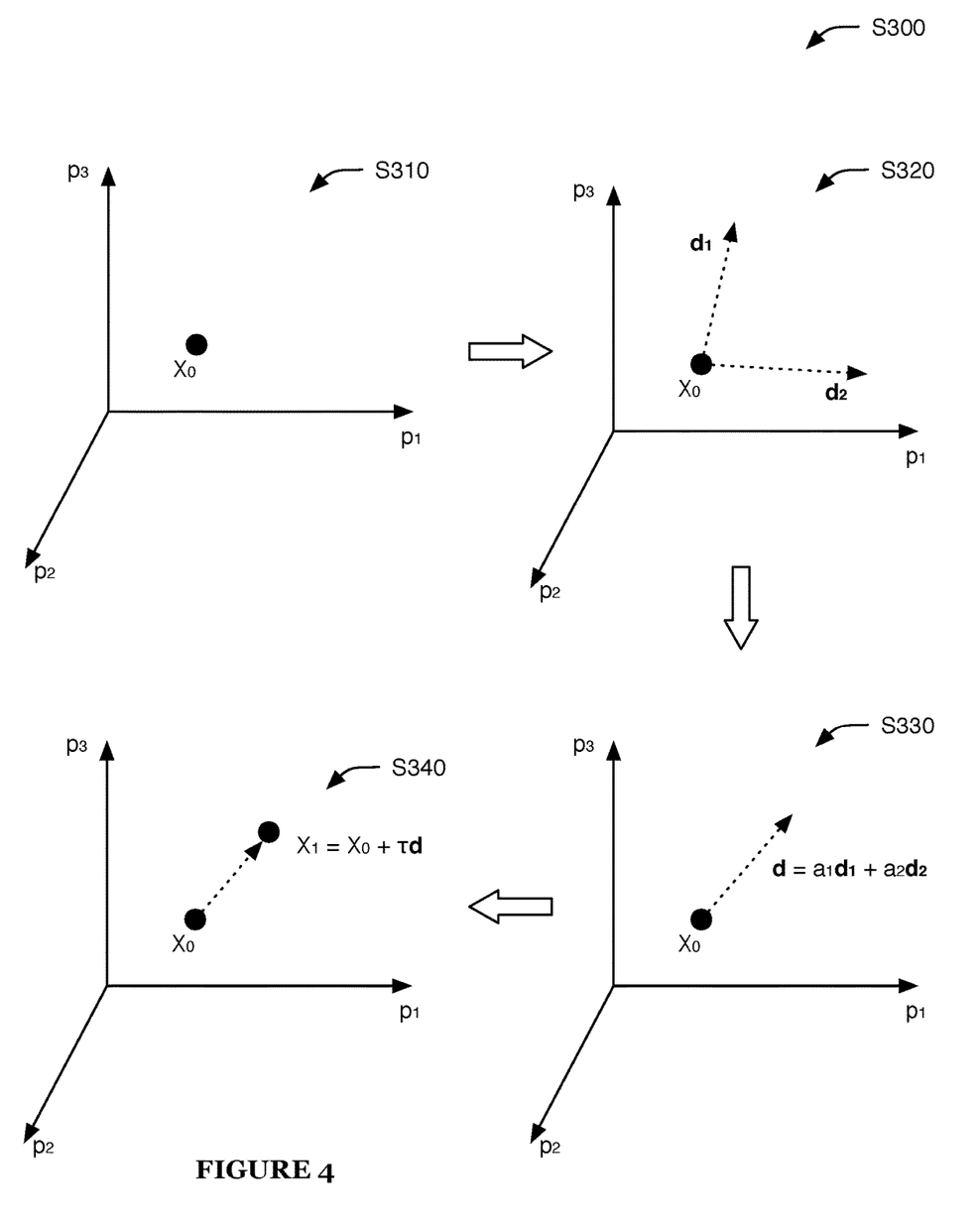
FIG. 4 is a flowchart representation of an example of a first portion of the method.

Determining a final point S300 preferably functions to, for an initial point (e.g., for each initial point determined in S200, such as in separate performances of S300), search for a corresponding (e.g., nearby) final point (e.g., searching starting from the initial point). Each final point is preferably a point on or near the Pareto front. S300 preferably includes: determining an initial point S310; determining a set of local ascent vectors S320; determining an ascent direction S330; and determining an updated point S340 (e.g., as shown in FIGS. 1B and/or 4). S300 can optionally include repeating elements of the search S350, and/or can include any other suitable elements.

Determining an initial point S310 preferably functions to determine a point from which to start a search for a corresponding final point. The initial point can be chosen randomly, predetermined, determined based on historical data (e.g., wherein the initial point is a previously used point, such as corresponding to a previously used transmitter configuration), and/or selected in any other suitable manner. In some embodiments, S310 includes determining the initial point as described above regarding S200 (e.g., performing S200 to determine the initial point, such as performing the second embodiment of S200 using one or more previously-determined final points as the generation points, and/or performing the first embodiment of S200). However, S310 can additionally or alternatively include determining an initial point in any other suitable manner.

Determining a set of local ascent vectors S320 preferably functions to determine vectors in the search space along which one or more objective functions may be improved relative to the initial point. S320 preferably includes, for each objective function $f_i$, determining a corresponding local ascent vector $d_i$ from the initial point. The local ascent vector is preferably determined by performing a local optimum search (e.g., gradient-based algorithm such as gradient descent, conjugate gradient descent, etc.; gradient-free algorithm such as Nelder-Mead, adaptive meshing, etc.) based on the corresponding objective function (e.g., a search to optimize the corresponding objective function). The local search is preferably performed using a search algorithm for which the number of points (in the parameter space) for which the objective function must be evaluated (e.g., evaluated as described above regarding S100) is independent (or substantially independent) of the dimension of the search space (or, alternatively, for which the number of points increases sub-linearly with the number of dimensions of the search space). For example, the local search can be performed using a Nelder-Mead search algorithm. Alternatively, the search can be performed using a search algorithm for which the number of points evaluated increases linearly, substantially linearly, or super-linearly with the number of dimensions of the search space. Preferably, the local search is performed for a few iterations (e.g., for a threshold number of iterations, such as 1, 2, 3, 5, 10, 3-5, 5-10, 10-25, etc.; until a convergence criterion is achieved; etc.), but can alternatively be performed for any other suitable number of iterations. The local search preferably results in a local optimum $\hat{x}_i$, wherein the local ascent vector $d_i$ is defined as the direction from the initial point $x_0$ to the local optimum ($d_i = \hat{x}_i - x_0$). Alternatively, the local ascent vector can be determined using a gradient-based technique. For example, the gradient (with respect to the corresponding objective function) at or near $x_0$ can be determined, wherein the local ascent vector is equal to the gradient. However, the local ascent vector can additionally or alternatively be determined in any other suitable manner.

The set of all local ascent vectors (preferably, one local ascent vector corresponding to each objective function) for an initial point can define an ascent cone. The set of all local ascent vectors is preferably a basis of the ascent cone, but can alternatively be any set of vectors that span the ascent cone (e.g., wherein some or all of the ascent cone spanning vectors are not linearly independent).

However, S320 can additionally or alternatively include determining any other suitable set of local ascent vectors in any suitable manner.

Determining an ascent direction S330 preferably functions to select an ascent direction from the ascent cone (e.g., determine a linear combination of the local ascent vectors). For N ascent vectors (e.g., corresponding to each of N objective functions), the ascent direction d can be defined as $d = \sum_{i=1}^{N} a_i d_i$, with $a_i > 0$ and $\sum_{i=1}^{N} a_i = 1$.

In a first embodiment, S330 includes treating this ascent vector selection as another multi-objective optimization (an optimization sub-problem), wherein the objective functions of the sub-problem are equal to the rate of ascent of each objective function of the main optimization problem, and the search space is defined by (e.g., parameterized by) the coefficients of the linear combination of local ascent vectors (or, analogously, defined by the directions within the ascent cone). For example, solving the multi-objective optimization sub-problem can include iterating through coefficient value sets (including a value for each coefficient of the linear combination), wherein for each coefficient value set, the objective functions of the sub-problem are evaluated (preferably excluding any coefficient value set that does not result in a point that Pareto dominates the initial point $x_0$).

In a second embodiment, the ascent direction is determined by solving a linear programming problem. In one example, for each $k \in \{1, \ldots, N\}$, the objective of the problem is to maximize $a_k$, subject to the following constraints:

$$\sum_{i=1}^{N} \alpha_i d_i \cdot d_j \geq 0 \,\forall\, j = 1, \ldots, N; \text{ and}$$

$$\sum_{i=1}^{N} \alpha_i \leq 1, \text{ where } \alpha_i \geq 0 \,\forall\, j = 1, \ldots, N.$$

In this embodiment, determining the ascent direction includes solving the linear programming problem. The linear programming problem can be solved using one or more Simplex algorithms, criss-cross algorithms, interior point methods (e.g., path following methods, ellipsoid methods, Karmarkar's algorithm, Affine scaling methods, Mehrotra predictor-corrector method, etc.), column generation algorithms, and/or any other suitable linear programming approaches. If no non-degenerate solution (i.e., a solution in which at least one coefficient is non-zero) to the linear programming problem exists, then the initial point $x_0$ is on the Pareto front, and so $x_0$ is the final point. Otherwise, the solution to the linear programming problem defines the ascent direction as $d = \sum_{i=1}^{N} a_i d_i$. However, S330 can additionally or alternatively include determining the ascent direction in any other suitable manner.

Determining an updated point S340 preferably functions to determine a point near the initial point along the ascent direction. S340 preferably includes performing a line search along the ascent direction from the initial point $x_0$, such that the updated point $x_1 = x_0 + \tau d$, wherein $\tau$ is varied over values greater than zero. The line search is preferably performed until a convergence threshold is reached, such as until $x_1$ Pareto dominates $x_0$. The line search can additionally or alternatively be performed until a number of iterations of the line search have been performed, until a derivative (e.g., derivative along the ascent direction, gradient, etc.) of an objective function (e.g., the objective function with the largest such derivative) is less than a threshold value, and/or until any other suitable criteria are satisfied. However, S340 can additionally or alternatively include determining the updated point in any other suitable manner.

Repeating elements of the search S350 preferably functions to iteratively approach the Pareto front (e.g., to iteratively find points closer to the Pareto front, as compared with the initial point and with points found in previous iterations), more preferably until the final point is determined. S350 can include iteratively repeating one or more elements of S300, using the updated point (e.g., determined in S340 of the previous iteration) in place of the initial point received in S310. S350 preferably includes iteratively repeating S320, S330, and S340, but can additionally or alternatively include repeating any other suitable set of elements of S300 (and/or performing any other suitable elements).

Preferably, S350 includes continuing to iterate until a convergence criterion is met. In a first example, the convergence criterion includes, in S330, failing to determine a non-degenerate ascent direction (i.e., non-zero vector), which can indicate that the updated point is on (or near) the Pareto front. Additionally or alternatively, the convergence criterion can include that one or more objective function values (e.g., all objective function values) are greater than a threshold amount (shared threshold amount, threshold amount specific to each objective function, etc.) The convergence criterion can additionally or alternatively include reaching a threshold cutoff limit, such as a limit on the number of iterations, a limit on the time elapsed performing S300, and/or a limit on any other suitable metrics. Once the convergence criterion is met, the updated point determined in the final iteration is preferably treated as the final point (i.e., wherein the final point determined by performing S300 is the updated point determined in the final iteration).

The method preferably includes performing S300 for each of the initial points (e.g., performed consecutively, concurrently, at different times, and/or with any other suitable timing) to determine a corresponding final point (e.g., in the manner described above). In some examples, the method can include using one or more of the final points determined in S300 as generation points for additional performances of S200, preferably wherein S300 is then performed using one or more resulting initial points from the additional performance(s) of S200 (preferably, using each resulting initial point). For example, the method can include: performing S200 (e.g., the first embodiment of S200) to generate a first set of initial points; performing S300 for each initial point of the first set, thereby generating a first set of final points; performing S200 based on the first set of final points (e.g., performing the second embodiment of S200 using one or more final points of the first set as generation points, preferably using each final point of the first set) to generate a second set of initial points; and performing S300 for each initial point of the second set, thereby generating a second set of final points (e.g., wherein all the final points of the first and second sets, or a subset thereof, can be provided as final points, preferably representing points on or near the Pareto front). However, the method can additionally or alternatively include performing S300 to determine any other suitable final points in any suitable manner, and/or the method can additionally or alternatively include any other suitable elements performed in any suitable manner.

An alternative embodiment preferably implements the some or all of above methods in a computer-readable medium storing computer-readable instructions. The instructions are preferably executed by computer-executable components preferably integrated with a communication routing system. The communication routing system may include a communication system, routing system and a pricing system. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

Although omitted for conciseness, embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for wireless power transmission from a transmitter to a plurality of receivers, the method comprising:
    evaluating a set of points in a transmission parameter space based on a set of objective functions that map from the transmission parameter space to an objective space associated with the plurality of receivers, wherein each point in the transmission parameter space corresponds to a respective transmission configuration of the transmitter, wherein evaluating the set of points comprises, for each point of the set:
        at the transmitter, wirelessly transmitting power while configured substantially in a respective transmission configuration corresponding to the point;
        at the plurality of receivers, receiving power while the transmitter is configured substantially in the respective transmission configuration;
        at the plurality of receivers, based on the power received while the transmitter is configured substantially in the respective transmission configuration, determining a respective set of power reception metrics associated with the point; and
        based on the respective set of power reception metrics, evaluating the set of objective functions at the point;
    determining a subset of dominant points within the transmission parameter space, wherein:

the set of points comprises the subset of dominant points;
for each dominant point of the subset, no point of the set of points is Pareto dominant, with respect to the objective space, over the dominant point;
selecting a first point from the subset of dominant points, wherein the first point corresponds to a first transmission configuration; and
in response to selecting the first point, at the transmitter, wirelessly transmitting power to the plurality of receivers while configured substantially in the first transmission configuration.

2. The method of claim 1, wherein:
the objective space defines a Pareto front in the objective space, wherein each point on the Pareto front is Pareto-optimal with respect to the set of objective functions; and
each dominant point of the subset is substantially on the Pareto front.

3. The method of claim 1, wherein each receiver of the plurality is associated with a different objective function of the set.

4. The method of claim 3, wherein each objective function of the set is indicative of a respective power reception metric of the receiver associated with the objective function.

5. The method of claim 4, wherein each respective power reception metric is indicative of power transmission efficiency from the transmitter to the receiver associated with the objective function.

6. The method of claim 1, wherein:
the transmitter comprises a plurality of transmission elements; and
for each transmission element of the plurality, the transmission parameter space comprises a respective parameter.

7. The method of claim 6, wherein:
the plurality of transmission elements defines a phased array; and
for each transmission element of the plurality, the respective parameter is a respective phase parameter.

8. The method of claim 7, wherein, for each transmission element of the plurality, the transmission parameter space further comprises a respective amplitude parameter.

9. The method of claim 1, wherein determining the subset of dominant points comprises:
based on an initial point of the set of points, determining a set of ascent vectors extending from the initial point in the transmission parameter space;
determining a total ascent direction based on a linear combination of the ascent vectors;
selecting an updated point along the total ascent direction, wherein the updated point is Pareto dominant, with respect to the objective space, over the initial point; and
determining a dominant point of the subset based on the updated point.

10. The method of claim 9, wherein determining the dominant point comprises:
based on the updated point, determining an updated set of ascent vectors extending from the updated point in the transmission parameter space;
determining an updated total ascent direction based on a linear combination of the ascent vectors of the updated set; and
selecting the dominant point along the updated total ascent direction, wherein the dominant point is Pareto dominant, with respect to the objective space, over the updated point.

11. The method of claim 9, wherein each ascent vector of the set of ascent vectors is associated with a respective objective function of the set of objective functions.

12. The method of claim 11, wherein determining the set of ascent vectors comprises, for each ascent vector of the set, determining the ascent vector based on a local optimum search with respect to the associated objective function.

13. The method of claim 12, wherein, for each ascent vector of the set, the local optimum search is performed beginning substantially at the initial point.

14. The method of claim 12, wherein each ascent vector extends from the initial point to a respective convergence point of the associated local optimum search.

15. The method of claim 12, wherein, for each ascent vector of the set, the local optimum search comprises a gradient-free search.

16. A system for wireless power transmission, the system comprising:
a transmitter associated with a transmission parameter space, wherein each point in the transmission parameter space corresponds to a respective transmission configuration of the transmitter; and
a plurality of receivers;
wherein:
a set of objective functions map from the transmission parameter space to an objective space associated with the plurality of receivers;
for each point of a set of points in the transmission parameter space:
the transmitter wirelessly transmits power while configured substantially in a respective transmission configuration corresponding to the point;
based on power received while the transmitter is configured substantially in the respective transmission configuration, the plurality of receivers determine a respective set of power reception metrics associated with the point; and
based on the respective set of power reception metrics, the system evaluates the set of objective functions at the point;
the system determines a subset of dominant points within the transmission parameter space, wherein:
the set of points comprises the subset of dominant points; and
for each dominant point of the subset, no point of the set of points is Pareto dominant, with respect to the objective space, over the dominant point;
the system selects a first point from the subset of dominant points, wherein the first point corresponds to a first transmission configuration; and
in response to selecting the first point, the transmitter wirelessly transmits power to the plurality of receivers while configured substantially in the first transmission configuration.

17. The system of claim 1, wherein:
the system further selects a second point from the subset of dominant points, wherein the second point corresponds to a second transmission configuration;
based on the evaluations of the set of objective functions at the first and second points, the system determines a charging plan comprising:
a first duty cycle associated with the first point; and
a second duty cycle associated with the second point; and the transmitter wirelessly transmits power to the plurality of receivers while switching between the first and second transmission configurations based on the charging plan.

18. The system of claim 16, wherein:

each receiver of the plurality is associated with a different objective function of the set; and for each point of the set of points, each receiver of the plurality:
  receives power transmitted by the transmitter; and
  determines a respective power reception metric associated with the point, wherein the objective function associated with the receiver is evaluated based on the respective power reception metric.

19. The system of claim 16, wherein:

the transmitter comprises a plurality of transmission elements defining a phased array; and for each transmission element of the plurality, the transmission parameter space comprises a respective phase parameter.

20. The system of claim 16, wherein:

the objective space defines a Pareto front in the objective space, wherein each point on the Pareto front is Pareto-optimal with respect to the set of objective functions; and each dominant point of the subset is substantially on the Pareto front.

* * * * *